United States Patent
Ibrahim et al.

(10) Patent No.: US 10,938,709 B2
(45) Date of Patent: Mar. 2, 2021

(54) MECHANISM FOR DYNAMIC LATENCY-BANDWIDTH TRADE-OFF FOR EFFICIENT BROADCASTS/MULTICASTS

(71) Applicant: Advanced Micro Devices, Inc., Santa Clara, CA (US)

(72) Inventors: Mohamed Assem Ibrahim, Santa Clara, CA (US); Onur Kayiran, Fairport, NY (US); Yasuko Eckert, Bellevue, WA (US); Jieming Yin, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/224,739

(22) Filed: Dec. 18, 2018

(65) Prior Publication Data
US 2020/0195546 A1    Jun. 18, 2020

(51) Int. Cl.
| H04L 12/761 | (2013.01) |
| H04L 12/781 | (2013.01) |
| H04L 12/715 | (2013.01) |
| H04L 12/931 | (2013.01) |
| H04L 12/729 | (2013.01) |
| H04L 12/733 | (2013.01) |

(52) U.S. Cl.
CPC ............ H04L 45/16 (2013.01); H04L 45/125 (2013.01); H04L 45/52 (2013.01); H04L 45/64 (2013.01); H04L 49/203 (2013.01); *H04L 45/122* (2013.01); *H04L 45/126* (2013.01)

(58) Field of Classification Search
None
See application file for complete search history.

(56) References Cited

U.S. PATENT DOCUMENTS

| 8,570,859 B1* | 10/2013 | Satapathy | H04L 1/22 370/225 |
| 2005/0010687 A1* | 1/2005 | Dai | H04L 12/1854 709/245 |
| 2007/0189290 A1* | 8/2007 | Bauer | H04L 12/1836 370/390 |
| 2008/0304480 A1* | 12/2008 | Langguth | H04L 45/123 370/389 |

(Continued)

OTHER PUBLICATIONS

Jerger, N. E., Peh, L. S., & Lipasti, M. (Jun. 2008). Virtual circuit tree multicasting: A case for on-chip hardware multicast support. In Computer Architecture, 2008. ISCA'08. 35th International Symposium on (pp. 229-240). IEEE.

(Continued)

*Primary Examiner* — Anh Ngoc M Nguyen
(74) *Attorney, Agent, or Firm* — Liang & Cheng, PC

(57) ABSTRACT

A method includes receiving, from an origin computing node, a first communication addressed to multiple destination computing nodes in a processor interconnect fabric, measuring a first set of one or more communication metrics associated with a transmission path to one or more of the multiple destination computing nodes, and for each of the destination computing nodes, based on the set of communication metrics, selecting between a multicast transmission mode and unicast transmission mode as a transmission mode for transmitting the first communication to the destination computing node.

20 Claims, 9 Drawing Sheets

(56) References Cited

U.S. PATENT DOCUMENTS

| | | | |
|---|---|---|---|
| 2015/0277779 A1* | 10/2015 | Devarapalli | G06F 9/45558 |
| | | | 711/162 |
| 2016/0205157 A1* | 7/2016 | Chu | H04L 45/22 |
| | | | 370/312 |
| 2016/0277469 A1* | 9/2016 | Gilson | H04L 65/4069 |
| 2017/0264571 A1* | 9/2017 | Aibester | H04L 49/9005 |
| 2018/0336133 A1* | 11/2018 | Turner | G06F 12/1072 |

OTHER PUBLICATIONS

Singh, I., Shriraman, A., Fung, W. W., O'Connor, M., & Aamodt, T. M. (Feb. 2013). Cache coherence for GPU architectures. In 2013 IEEE 19th International Symposium on High Performance Computer Architecture (HPCA) (pp. 578-590). IEEE.

* cited by examiner

MECHANISM FOR DYNAMIC LATENCY-BANDWIDTH TRADE-OFF FOR EFFICIENT BROADCASTS/MULTICASTS

BACKGROUND

Coherence protocols used for maintaining cache coherence in both central processing unit (CPU) and graphics processing unit (GPU) processor domains are a source of substantial traffic overhead. One source of traffic overhead is invalidation traffic due to sharing of the same cache line between multiple cores. Such traffic overhead stems from the broadcast/multicast behavior of the invalidations performed by the coherence protocol. This broadcasting/multicasting of the invalidations consumes considerable interconnect bandwidth that can be otherwise used for other messages. The problem is aggravated in non-uniform memory access (NUMA) systems, as this traffic may go to different NUMA domains, incurring extra latency due to the remote accesses, and consuming valuable inter-NUMA domain bandwidth.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Applications executing across multiple processing cores in a processor domain, in which the multiple cores communicate via a processor interconnect fabric, can have varying operating characteristics. Some applications are bandwidth sensitive while others are latency sensitive. Additionally, within a single application, different behaviors arise in different phases of execution (e.g., different phases in a CPU application, or different fine-grain GPU tasks). Such diversity in sensitivity and requirements provides opportunities for dynamically trading bandwidth for latency based on the current behavior of the running application and the current state of the interconnect to increase the overall application throughput.

In one embodiment, a computing system dynamically trades off the consumed interconnect bandwidth at the expense of higher latency. Specifically, if interconnect bandwidth is limited (or constitutes a bottleneck), then the transmission mode for sending a message to multiple processing cores can be switched from broadcasting or multicasting to sequential unicasting. In the sequential unicasting mode, the message is transmitted sequentially to each of its destination processing cores based on greedy nearest neighbor selection. In one embodiment, coherence invalidation messages or any other types of messages that are broadcast or multicast among processing cores, caches, nodes, etc. are also transmitted in this manner. For example, in GPU systems, a single node often supplies the same data to multiple other nodes, and the data is transmitted via multicast or sequential unicast depending on the bandwidth availability of the processor interconnect fabric, latency demand for the data, or other factors.

Figure 1:
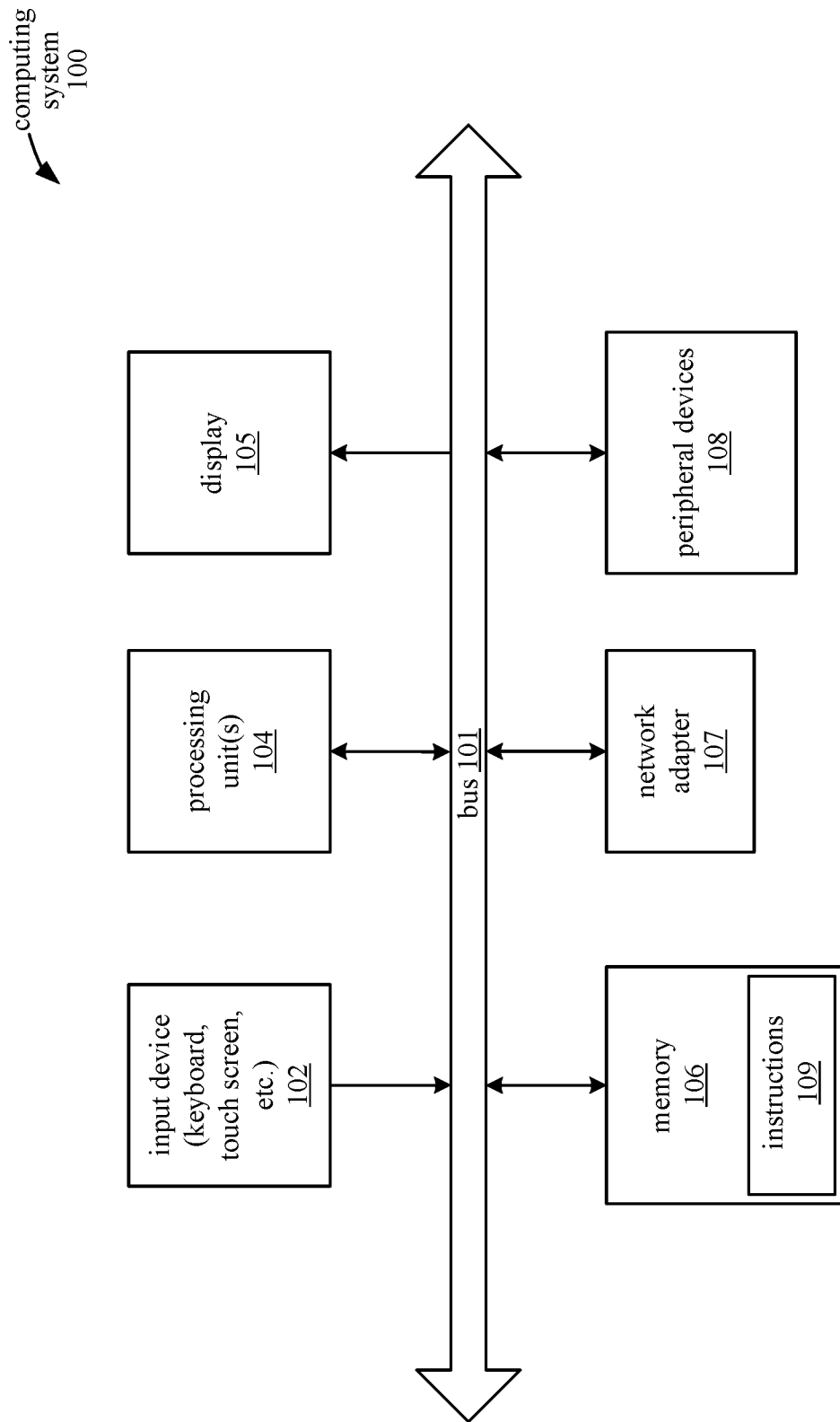
FIG. 1 illustrates a computing system, according to an embodiment.

FIG. 1 illustrates an embodiment of a computing system 100 in which the dynamic transmission mode switching is implemented. In general, the computing system 100 is embodied as any of a number of different types of devices, including but not limited to a laptop or desktop computer, mobile device, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple buses 101, network adapters 107, memory devices 106, etc.

Figure 2:
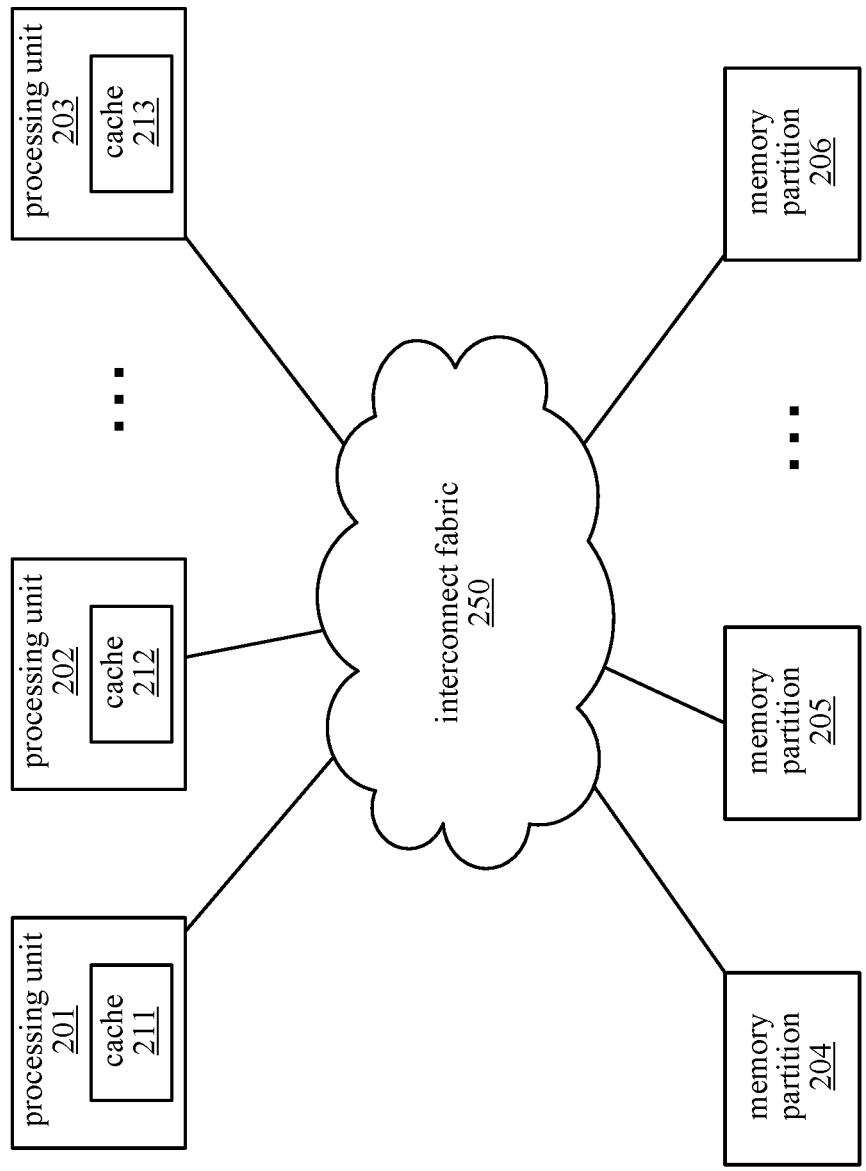
FIG. 2 illustrates multiple computing nodes connected via an interconnect fabric, according to an embodiment.

In one embodiment, the processing units 104 and memory 106 in the computing system 100 are implemented as multiple processing units and memory partitions, respectively, connected by an interconnect fabric as illustrated in FIG. 2. The interconnect fabric 250 connects multiple computing nodes together, including processing units 201-203 and memory partitions 204-206. In one embodiment, these computing nodes 201-206 reside within the same device package and on the same integrated circuit die. For example, all of the nodes 201-206 can be implemented on a monolithic CPU die having multiple processing cores. In an alternative embodiment, some of the nodes 201-206 reside on different integrated circuit dies. For example, the nodes 201-206 can reside on multiple chiplets attached to a common interposer, where each chiplet has multiple (e.g., 4) processing cores.

The interconnect fabric 250 includes multiple interconnect links that provide, for each of the nodes 201-206, a transmission path to communicate with any other one of the nodes 201-206. In one embodiment, the interconnect fabric 250 provides multiple different transmission paths between any pair of origin and destination nodes, and a different transmission path for any given origin node to communicate with each possible destination node.

Each of the processing units 201-203 includes a set of one or more processing cores and has access to one of the cache devices 211-213, respectively, which the processing unit uses to cache data from the memory partitions 204-206 in the system. When data in one of the backing memory partitions 204-206 is changed, any corresponding cache lines now containing stale data are invalidated via invalidation messages transmitted via the interconnect fabric 250. When cache lines are shared by multiple processing units, the invalidation message is transmitted to each of these processing units over the interconnect fabric 250.

Figure 3:
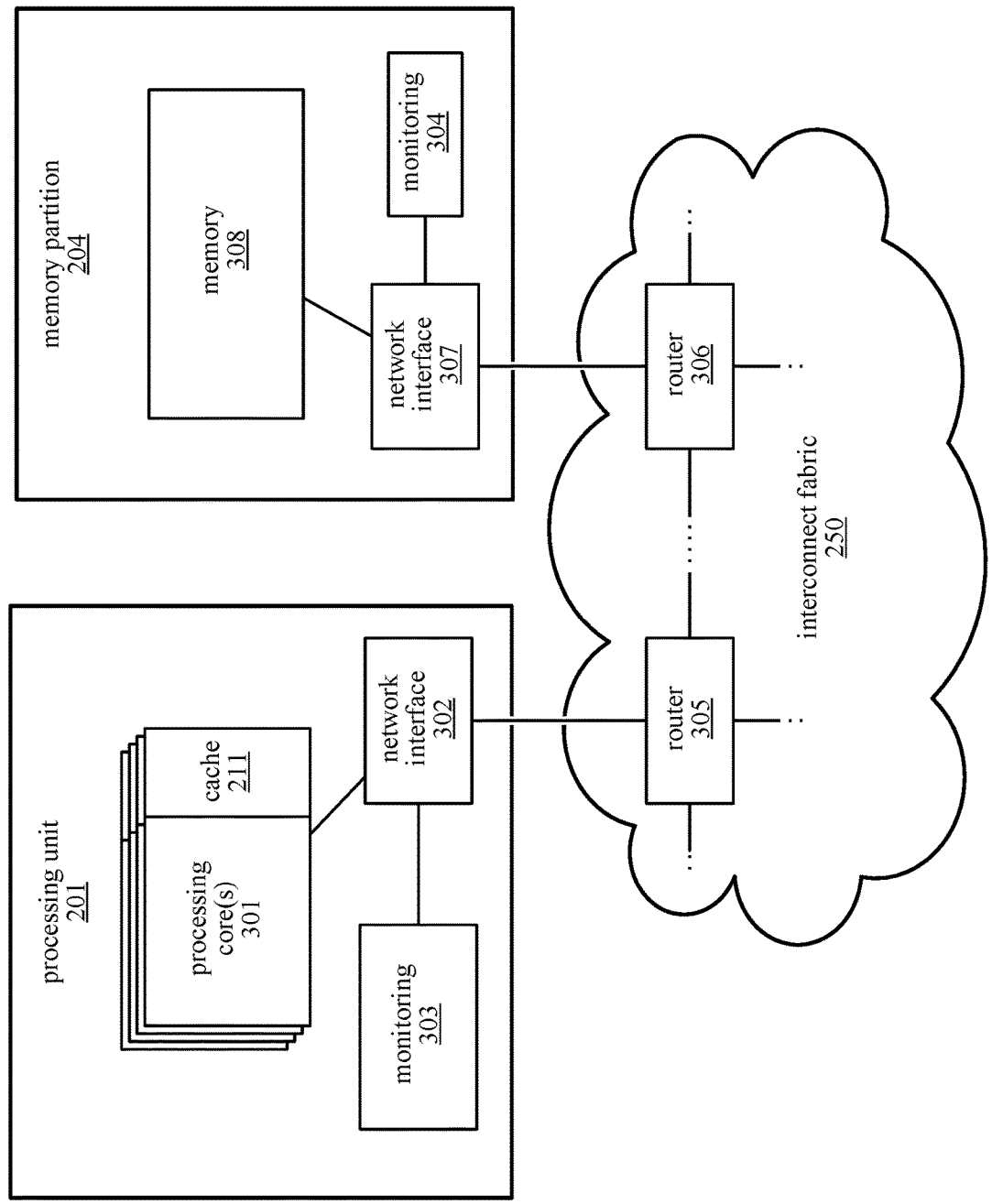
FIG. 3 illustrates a processing node and a memory partition connected via an interconnect fabric, according to an embodiment.

FIG. 3 illustrates hardware components in a processing unit 201 and a memory partition 204 that are connected via the interconnect fabric 250, according to an embodiment. The processing unit 201 includes a set of one or more processing cores 301 that perform computations by executing instructions on data stored in the memory partitions 204-207. The data is cached for low latency access by the processing cores 301 in a set of local cache memory devices 211 connected to the processing cores 301. Messages destined for the processing cores 301 are received in the processing unit 201 at a network interface 302, which receives transmissions from a router 305.

The router 305 connects the processing unit 201 to the interconnect fabric 250 and performs the functions of directing to the processing unit 201 any traffic addressed to the processing unit 201. The router 305 also directs traffic addressed to other nodes (from processing unit 201 or a different origin node) to the appropriate link in the interconnect fabric 250 for reaching those destination nodes.

The memory partition 204 stores data used by the processing units 201-203 in a memory device 308 and is connected to the interconnect fabric 250 via its own network interface 307 and a router 306. Router 306 directs traffic to the appropriate destination computing nodes in similar fashion as router 305. In one embodiment, the memory partition 204 implements a cache directory that stores data that is shared between any of the caches 211 and other cache memories 212-213 in the system 100 to maintain coherence between these cache devices 211-213. When any of the processing cores 301 loads a data from a memory partition to its local cache (e.g., cache 211), the request is granted via the cache directory. When an entry is changed, the cache directory either updates or invalidates the other caches with that entry.

Each of the computing nodes 201 and 204 includes a monitoring circuit 303 and 304, respectively. The monitoring circuits measure traffic conditions of the interconnect fabric 250 by measuring communication metrics such as packet latency, packet loss, data throughput, buffer occupancy, memory usage, link bandwidth utilization, downstream router activity, latency sensitivity of applications, message types, number of destination nodes, and/or other metrics or a combination of metrics indicating the amount of available bandwidth or other traffic conditions in the interconnect fabric 250. In alternative embodiments, the monitoring circuits 303 and 304 are attached to other components, such as the routers 305 and 306, memory controllers, etc. In addition, the monitoring circuits 303 and 304 are capable of transmitting their measured communication metrics to other nodes via the interconnect fabric 250 or by a separate communication channel.

Based on the measured communication metrics, the processing unit 201 determines whether to transmit a communication over the interconnect fabric 250 by a unicast transmission mode or a multicast transmission mode. When communication metrics are received from monitoring circuits attached to other computing nodes, the processing unit 201 is able to select the transmission mode based on the traffic conditions for a wider region of the interconnect fabric 250 over which the communication metrics are measured. In the system 100, computing nodes that do not have a monitoring circuit select their transmission modes based on communication metrics measured by monitoring circuits in one or more other computing nodes. Accordingly, in one embodiment, in each of multiple regions of the interconnect fabric 250, a central node monitors the traffic conditions for the region, and nodes within the region select their transmission modes based on the metrics measured by the central monitoring node.

Figure 4:
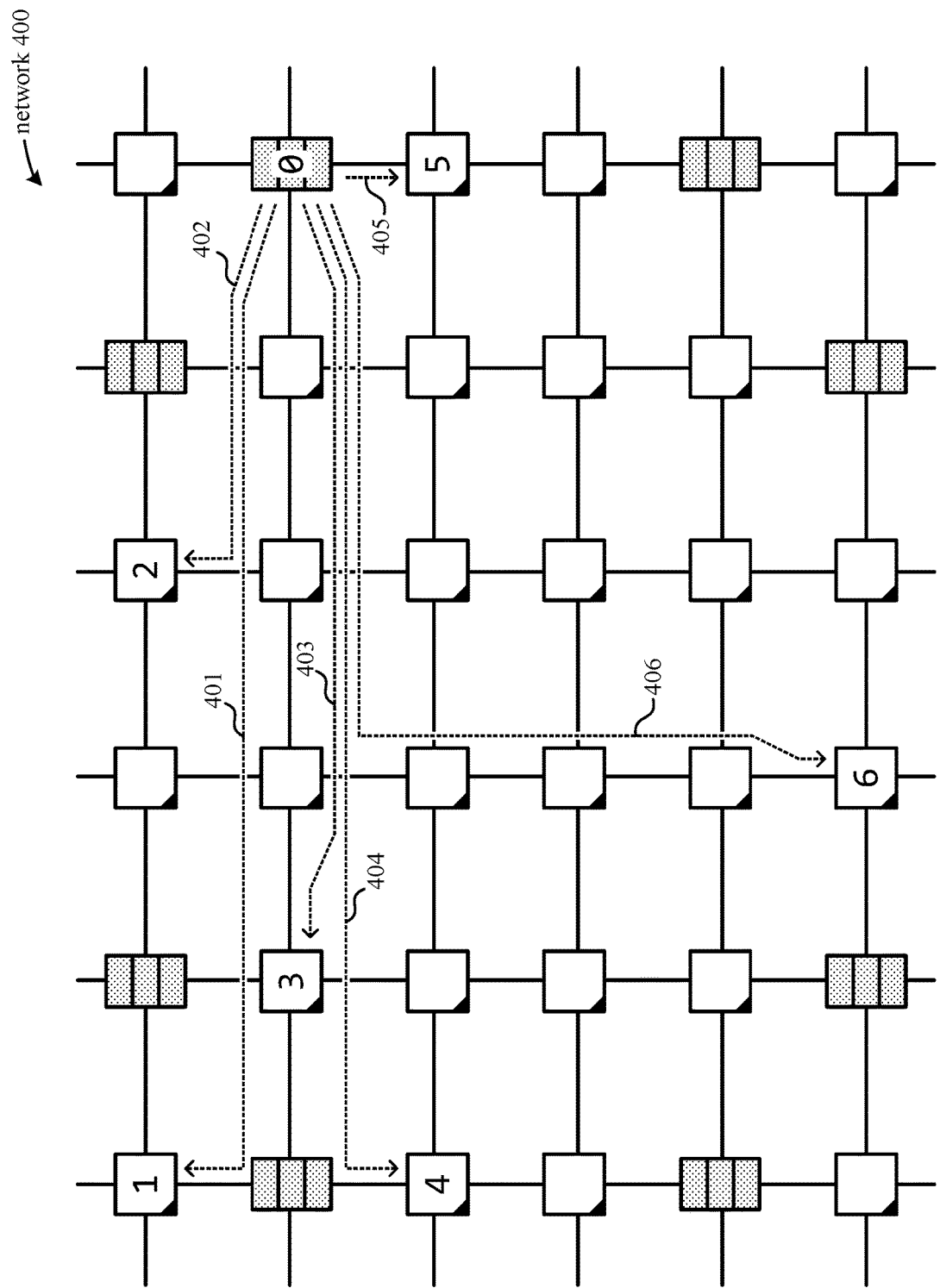
FIG. 4 illustrates multicast transmission of packets in an interconnect fabric, according to an embodiment.

FIG. 4 illustrates a processor interconnect network 400 including multiple processing units and memory partitions connected by an interconnect fabric, according to an embodiment. In the network 400, the memory partition 0 is an origin node (e.g., a cache directory) that transmits a message (e.g., a cache invalidation message) in multicast transmission mode to multiple processing units 1-6 via transmission paths 401-406, respectively. As illustrated, each of six messages carrying the same information is transmitted to its destination node by a different transmission path (i.e., a different subset of links) through the interconnect fabric. Multicasting is performed when the bandwidth of the network 400 is not constrained, and when low latency is prioritized; each of the messages takes the quickest path to its destination node.

Figure 5:
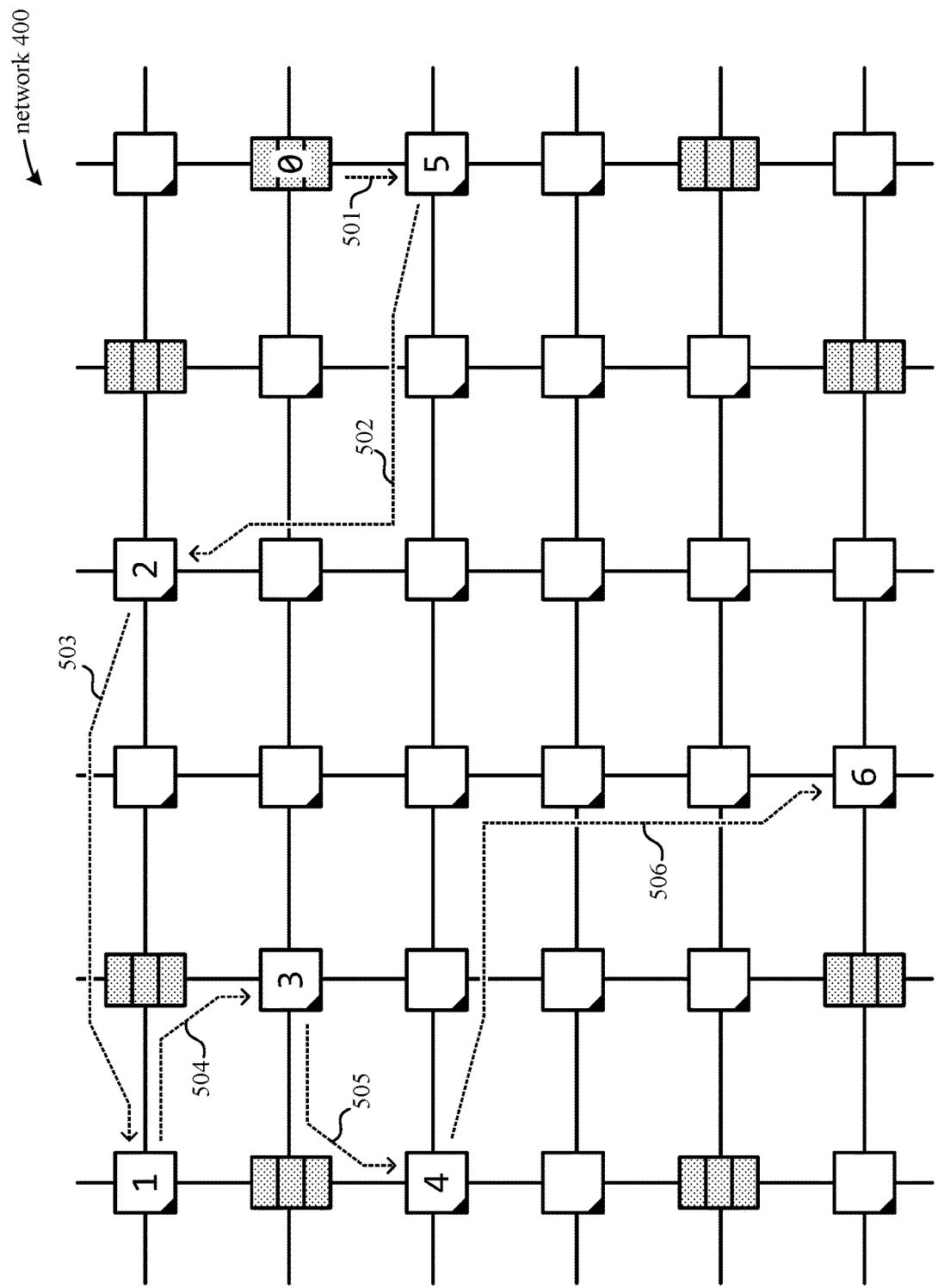
FIG. 5 illustrates sequential unicast transmission of packets in an interconnect fabric, according to an embodiment.

FIG. 5 illustrates the transmission of a message in the network 400 according to a sequential unicast transmission mode, according to an embodiment. In the network 400, the cache directory node 0 transmits a consolidated invalidation message that is relayed from one destination node to another based on the distance (e.g., the number of hops, physical distance, etc.) from the current node to the next destination node. In the illustrated example, the node nearest to the origin node 0 is node 5, so the invalidation message is transmitted to node 5 first via path 501. The nearest destination node to node 5 is node 2, so the message is forwarded from node 5 to node 2 via path 502. From node 2, both of nodes 1 and 4 are three hops away, so the next destination is selected arbitrarily based on the node index, or based on available link bandwidth. As illustrated, the message is transmitted from node 2 to node 1 via path 503. The message is forwarded to the remaining nodes 3, 4, and 6 via paths 504, 505, and 506, respectively, according to the same principles. In an alternative embodiment, each next destination node is selected based on one or more factors other than distance, such as link costs, latency demands for the messages, etc.

The sequential unicast transmission results in lower interconnect bandwidth consumption at the expense of higher latency for delivering the invalidation message. The conserved bandwidth is utilized by other messages, improving the overall throughput. To support sequential unicasting, the origin node from which the invalidation message originates embeds addresses of all destination nodes into the packet header. During the transmission process, each destination node removes its own address from the header after receiving the packet and before forwarding the packet to the next destination.

Figure 6A:
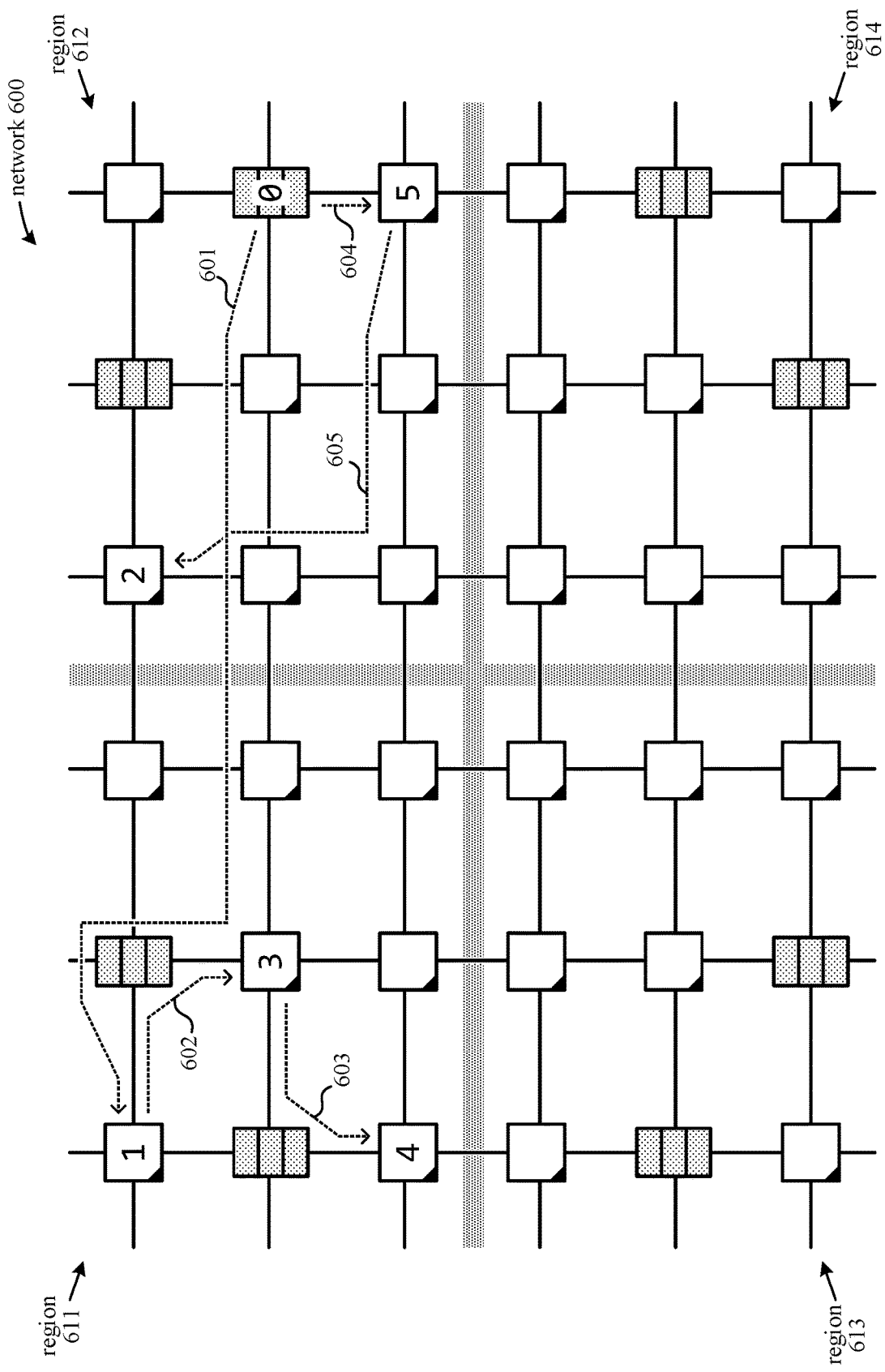
FIG. 6A illustrates a hybrid transmission mode for transmitting packets in an interconnect fabric, according to an embodiment.

FIG. 6A illustrates a processor interconnect network 600 that is divided into multiple regions 611-614, according to an embodiment. Each of the regions 611-614 includes a different subset of the computing nodes in the network 600. In the network 600, a hybrid multicast/unicast transmission mode is used to transmit the invalidation message to each of the nodes 1-5. The origin node 0 multicasts the message to one of the nodes in each of the regions 611 and 612 that contain at least one of the destination nodes 1-5. The message is transmitted via transmission path 601 to node 1 in region 611, and is also transmitted via transmission path 604 to node 5 in region 612. After the message has reached a node in each of the targeted regions 611 and 612, the remaining destination nodes in each region are reached via a sequential unicast from the first node in the region that received the message. From node 1 in region 611, the message is forwarded to the nearest node 3 via path 602, and from node 3 to node 4 via path 603. From node 5 in region 612, the message is forwarded to node 2 via path 605. The hybrid multicast/unicast transmission mode consumes less of the interconnect bandwidth than the multicast mode, and has lower latency than the sequential unicast mode.

Figure 6B:
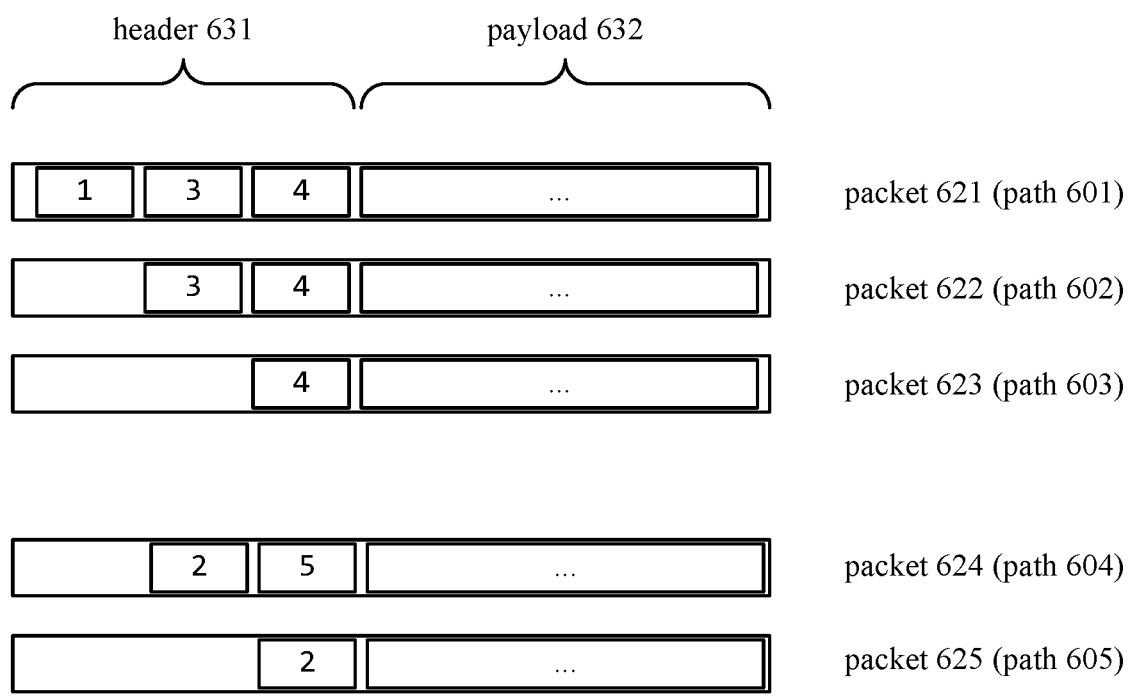
FIG. 6B illustrates packets transmitted in a hybrid transmission mode, according to an embodiment.

FIG. 6B illustrates the packets 621-625 that are transmitted along each of the respective paths 601-605 illustrated in FIG. 6A, according to an embodiment. Each of the packets 621-625 includes a header field 631 that contains the addresses of its destination nodes, and a payload field 632. Node 0 begins by transmitting packets 621 and 624. At each destination node, the router for the node removes the node's address from the header 631 of the received packet and determines, from the remaining destinations, the next destination node to which the packet is forwarded according to a greedy nearest neighbor selection process. For example, after the packet 621 is received at node 1, the router at node 1 removes node 1 from the header 631 of the packet 621, then selects the nearest node 3 as the next destination for sending the resulting packet 622. Upon receiving packet 622, the router at node 3 removes node 3 from the header and forwards the packet 623 to node 4. In one embodiment, packets 621 and 622 are readily identifiable as sequential unicast packets; however, packet 623 is indistinguishable from a packet sent via multicast transmission. Similarly, the first destination for packet 624 is determined to be node 5, since node 5 is the nearest node to the origin node 0. From node 5, the address for node 5 is removed from the header 631 and the resulting packet 625 is forwarded to the last remaining destination node 2.

Figure 7:
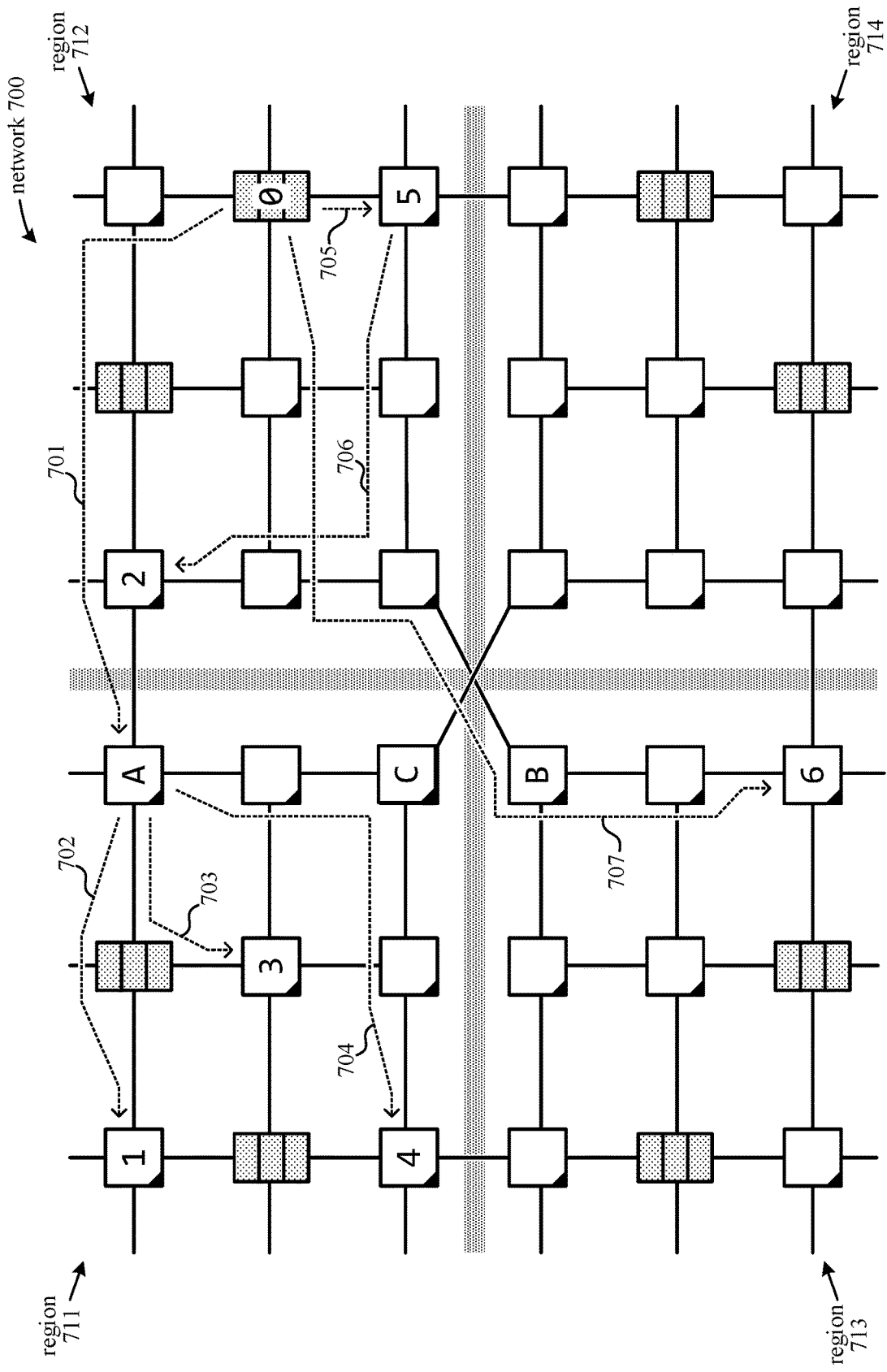
FIG. 7 illustrates a hybrid transmission mode for transmitting packets in an interconnect fabric having multiple regions determined by topology, according to an embodiment.

FIG. 7 illustrates a processor interconnect network 700 that is divided into multiple regions 711-714, according to an embodiment. In the network 700, each of the regions 711-714 represents a separate integrated circuit die. Nodes within the same die are more densely interconnected with each other than with nodes in other dies. That is, more bandwidth is available for communications between nodes on the same die, while bandwidth is limited for communication between nodes on different die. As illustrated, each region 711-714 has a single link to one of the nodes in each of the other regions 711-714. In one embodiment, each of the regions 711-714 represents a non-uniform memory access (NUMA) node. Each of the NUMA nodes contains a different subset of the processing nodes in the network 700.

For this topology, a hybrid of the unicast and multicast transmission modes is used to transmit messages from an origin node 0 in one region 712 to multiple nodes 1-5 in the same region 712 and other regions 711 and 713. A packet carrying the message is transmitted via multicast to each of the destination regions 711-713, with the modification that each of the packets is a sequential unicast packet (i.e., addressed to multiple destination nodes) if its destination region contains multiple destination nodes. Each packet is transmitted from the origin node 0 to its destination nodes in the region via a path that includes the nearest node in the destination region. This nearest node in the region is the first node in the region to receive the packet, and forwards the packet to the destination nodes in its region via multicast or sequential unicast, depending on the communication metrics measured for the region.

As illustrated, the node 0 transmits a first sequential unicast message via path 701 to the nearest node A in the region 711 that contains destination nodes 1, 3, and 4. In response to receiving the sequential unicast message addressed to nodes 1, 3, and 4 in the same region, node A selects a multicast or sequential unicast transmission mode for transmitting the message to each of the destination nodes 1, 3, and 4 based on the measured communication metrics for the region 711 or a subset of links in the region 711. In this case, node A determines that the paths 702, 703, and 704 to nodes 1, 3, and 4, respectively, are uncongested and therefore forwards the message using the multicast transmission mode. Nodes are also able to select a multicast transmission mode for some of the destination nodes while selecting a unicast transmission mode for other destination nodes. For example, if node A determines that path 702 is not congested and path 704 is congested, node A transmits the message in a first packet to node 1 via path 702 and transmits a second sequential unicast packet addressed to nodes 3 and 4. A node is thus able to group together any subset of the destinations into a sequential unicast packet.

The origin node 0 determines that region 712 is congested and therefore transmits the message to nodes 5 and 2 in the same region 712 via a sequential unicast packet (instead of multicast packets) addressed to nodes 5 and 2 that reaches these nodes 5 and 2 via transmission paths 705 and 706, respectively. Another packet reaches destination node 6 via path 707. The first node B in region 713 does not change the transmission mode even if the region 713 is not congested since node 6 is the only destination node in the region 713.

In more general terms, transmission paths passing through regions with low bandwidth availability (due to congestion, topology, etc.) are transmitted via sequential unicast packets each addressed to multiple destination nodes. After the low bandwidth region is crossed, an intermediate node in the path switches to the multicast transmission mode, forwarding the message separately to each destination node in the destination region when the destination region has sufficiently high bandwidth availability. If the destination region is congested, the intermediate node selects the sequential unicast transmission mode to conserve bandwidth when forwarding the message to the destination nodes in the congested region.

In one embodiment, nodes are grouped together into regions based on topology, similarity between the communication metrics measured at the nodes, proximity to a central monitoring node, etc. In one embodiment, regions are changed dynamically in response to changing metrics or phases of an application. For example, when a particular phase of an application causes a substantial traffic to be exchanged between a certain group of nodes, the group of nodes is treated as a congested region so that sequential unicast is used for communications that pass through the region.

In one embodiment, monitoring of communication metrics is performed separately for each of multiple static or dynamically adjustable regions. For example, when node 3 in the network 700 serves as a central monitoring node for region 711, metrics measured at node 3 are used to determine whether the multicast or sequential unicast mode will be used to transmit communications to any destination nodes in region 711. As such, the measured metrics or the selected transmission mode is communicated to nodes (e.g., A, 4, C) interfacing with other regions, at which the change in transmission mode can occur.

In one embodiment, the switching of the transmission mode based on measured communication metrics is controllable by software and can be enabled or disabled for specific regions of the processor interconnect network or for specific nodes. A user or operating system enables or disables the sequential unicasting feature by using application programming interface (API) calls such as enableBandwidthSavingMode( ) and disableBandwidthSavingMode( ).

Figure 8:
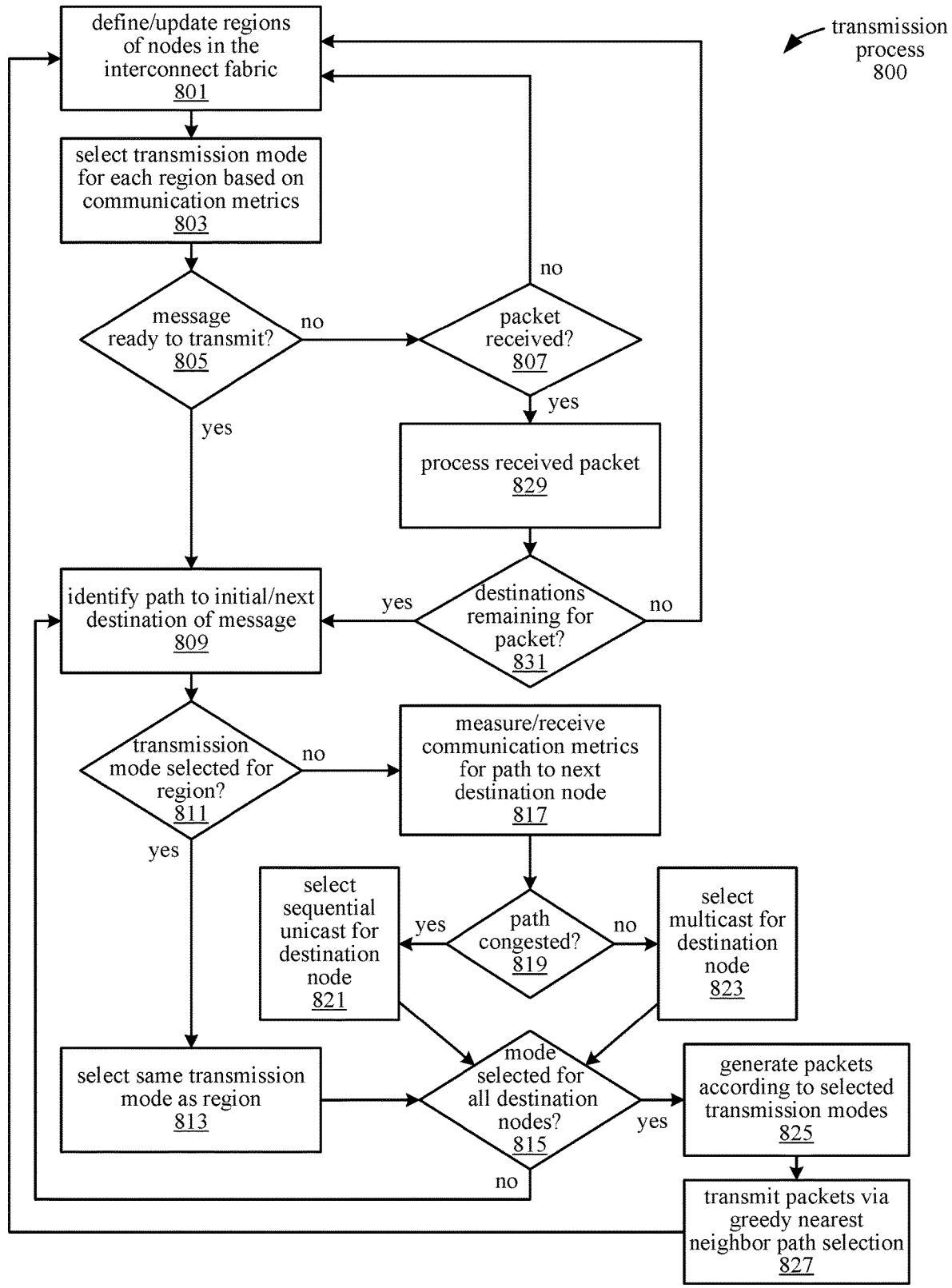
FIG. 8 is a flow diagram illustrating a process for transmitting packets in an interconnect fabric, according to an embodiment.

FIG. 8 is a flow diagram illustrating a process 800 for dynamically changing transmission modes based on measured communication metrics, according to an embodiment. The operations in the transmission process 800 are performed by a computing node, such as one of the computing nodes 201-206, and a router connected to the computing node. In alternative embodiments, operations and calculations in process 800 that are described below as being performed by a router are instead performed by other components, such as processing logic in the computing node (e.g., processing cores 301), or vice versa.

The process 800 begins at block 801. At block 801, regions are defined that each include a subset of nodes in the interconnect fabric 250. Each of the regions is defined by identifying a set of nodes to be included in the region that have correlated network performance characteristics for links connecting the set of nodes. For example, in certain applications, neighboring nodes exhibiting similarly high (or low) bandwidth utilization are grouped together into a region. In one embodiment, each node in a region is adjacent to (i.e., connected via a single link) at least one other node in the same region. In one embodiment, regions are defined based on the topology of links between the nodes. For example, in network 700 illustrated in FIG. 7, the regions 711-712 are defined based on the link topology of the interconnect fabric. In the network 700, each node has a link to multiple other nodes in the same region; however, each region is connected by only one link to each of the other regions. Accordingly, the nodes having high bandwidth availability for communicating with each other (e.g., due to more numerous connections) are grouped together into a region. In one embodiment, each of the regions resides in a different NUMA node of a set of NUMA nodes that are connected to each other.

At block 803, a transmission mode is selected for each region based on measured communication metrics for the region. The communication metrics for a region are measured by monitoring circuitry (e.g., 303 or 304) in some or all of the computing nodes in the region. Based on the measured metrics, a multicast transmission mode or a sequential unicast transmission mode is selected for transmitting communications through the region.

In one embodiment, a central monitoring node measures the communication metrics for the region and transmits the metrics to other nodes in the same region. The nodes then select the multicast or unicast transmission modes based on the received metrics. If the metrics indicate high bandwidth usage in the region (e.g., high buffer occupancy, high packet loss rate, high packet latency, etc. is observed) then the sequential unicast transmission mode is selected. If the metrics indicate low bandwidth usage in the region, then the multicast transmission method is selected. In one embodiment, the central monitoring node selects the transmission mode for the region and indicates the selected mode to other nodes in the region instead of transmitting communication metrics. In one embodiment, the transmission mode selection is based on communication metrics measured by more than one node in the region. The transmission modes for each region are selected independently from each other; that is, the transmission mode for one region is not affected by the transmission modes selected for an adjacent region. Furthermore, the defined regions in the network do not necessarily include all of the computing nodes in the network. Regions are defined by one or more of the processing nodes in the network, such as a central monitoring node, for example.

At block 805, if the node executing process 800 has a message ready for transmission, then the process 800 continues at block 807. At block 807, if the node has not received a packet from another node, the process 800 returns to block 801. The process 800 thus repeats the blocks 801-807 to repeatedly update the defined regions and their corresponding transmission modes while no packets are ready to be transmitted or have been received. This allows regions to change dynamically to accommodate changes in bandwidth utilization over time. For example, neighboring nodes that were grouped into the same region based on previously observed similar bandwidth consumption are regrouped into different regions when their bandwidth consumption characteristics begin to differ. Regions can also be redefined to account for changes in topology or any other events affecting the available bandwidth between nodes.

At block 805, if a message is ready for transmission, the process 800 continues at block 809. The message is transmitted from the core of a source computing node (e.g., processing core 301, memory 308) to a router via a network interface of the computing node (e.g., 302, 307) and is addressed to multiple destination nodes connected to the interconnect fabric 250.

At block 809, the router identifies a path (and/or a region through which the path passes) to the initial destination node of the message. At block 811, if the path passes through a region for which the transmission mode is already selected (as provided at block 803), then at block 813 the same transmission mode (i.e., multicast or sequential unicast) selected for the associated region is selected for transmitting the message to the destination node.

At block 811, if the transmission mode has not been selected for the region through which the transmission path to the destination node passes, or if the path does not pass through any defined region, then the process continues at block 817. At block 817, the router for the node obtains communication metrics associated with the path. The communication metrics are measured by monitoring circuitry (e.g., 303 or 304) in the node and provided at an input of the router, or are measured at another monitoring node and transmitted to the router input from the other node. The monitoring circuitry determines the set of communication metrics by measuring packet latency, throughput, memory activity, buffer occupancy, packet loss, and/or other metrics associated with a region or set of links of the processor interconnect fabric through which the transmission path passes. In one embodiment, the metrics provided to the router are calculated based on the raw measured values (e.g., by weighted sum, threshold comparison, etc.). If the node is a monitoring node, it also transmits the communication metrics (or alternatively, a transmission mode selected based on the metrics) to other nodes in the same region.

At blocks 819, 821, and 823, a transmission mode is selected for transmitting the message to the destination node based on whether the path to the destination node is congested, as determined based on the communication metrics. For example, if certain communication metrics (e.g., packet latency, packet loss, etc.) exceed a threshold value, then the path is congested and the sequential unicast mode is selected at block 821 for transmitting the message to the destination node using lower bandwidth consumption at the expense of higher latency. If the transmission path is not congested, then the multicast mode is selected at block 823 for lower latency at the expense of higher bandwidth consumption. In an alternative embodiment, the transmission mode is selected based on a latency demand for the message. For example, if a latency-sensitive application sends a message, the sensitivity is communicated to the router so that the lower latency multicast mode is selected.

After the transmission mode has been selected for the destination as provided at block 813, 821, or 823, the process 800 continues at block 815. At block 815, if a transmission mode has not been selected for all of the destination nodes of the message, then the process returns to block 809. The loop including blocks 809-823 is repeated to select a transmission mode for each of the multiple destinations to which the message will be addressed. Since the transmission modes are selected independently for each of the destinations, it is possible for the sequential unicast mode to be selected for a subset of destinations while the multicast mode is selected for the remaining destinations.

At block 815, if a transmission mode has been selected for all of the destinations to which the message will be addressed, then the process 800 continues at block 825. At block 825, the router generates packets for transmitting the message according to the selected transmission modes for each destination. One or more sequential unicast packets are generated, each including a header containing the addresses of multiple destinations for which the unicast was selected. In one embodiment, multiple destinations in the same region are addressed together in the same packet. For each destination node to be reached via multicast, a packet is generated that is addressed to only the one destination node. If the sequential unicast mode is selected for only one destination, then the resulting packet is addressed to only one node and is thus indistinguishable from a multicast packet.

At block 827, the generated packets carrying the message payload are transmitted through the interconnect fabric 250. In one embodiment, sequential unicast packets are routed through the interconnect fabric 250 based on a greedy nearest neighbor path selection process. At each destination node, the router selects the nearest destination node as the next destination for the packet. Thus, a sequence of the destination computing nodes for receiving the sequential unicast transmission is selected by greedy nearest neighbor matching. After the packets have been transmitted, the process 800 returns to block 801.

The process 800 begins again at block 801 as previously described. At block 807, if a packet is addressed to the node is received from a different origin node, then the packet is processed, as provided at block 829. When the received packet is a cache invalidation message, for example, the identified cache lines are invalidated. For other types of messages, the data in the packet is used in computations, stored in memory, or subjected to other operations by a core (e.g., processing core 301, memory 308) of the computing node. The router receiving the packet also removes the address of the receiving node from the packet header.

At block 831, if no more destination addresses remain in the packet header, the process 800 restarts at block 801. If there are additional destination addresses in the packet header (e.g., when the packet is a sequential unicast packet), then the process 800 continues at block 809. Blocks 809-827 are performed as previously described to determine a transmission mode for each of the remaining destinations and forward the packet to the destinations over the interconnect fabric.

A method includes receiving, from an origin computing node, a first communication addressed to multiple destination computing nodes in a processor interconnect fabric, measuring a first set of one or more communication metrics associated with a transmission path to one or more of the multiple destination computing nodes, and for each of the destination computing nodes, based on the set of communication metrics, selecting between a multicast transmission mode and unicast transmission mode as a transmission mode for transmitting the first communication to the destination computing node.

In the method, the measuring of the communication metrics further includes measuring packet latency, throughput, and memory activity associated with a region of the processor interconnect fabric. The transmission path to the destination computing node passes through the region.

In the method, the transmission mode is further selected based on a latency demand for the first communication.

The method further includes, for each region of a plurality of regions in the interconnect fabric, measuring communication metrics for the region, where the measured communication metrics for at least one of the regions includes the set of communication metrics. The method also includes, based on the measured communication metrics for the region, selecting a transmission mode for the region independently from the transmission modes selected for other regions of the plurality of regions. The method also includes, for each communication of a plurality of communications, where the plurality of communications includes the first communication, selecting between a unicast transmission mode and a multicast transmission mode based on a transmission mode selected for an associated region of the plurality of regions. The method also includes transmitting the communication through the associated region.

The method also includes, for each of multiple regions in the interconnect fabric, identifying a set of nodes within the region based on identifying correlated network performance characteristics of links connecting the set of nodes.

In the method, each of multiple regions in the interconnect fabric resides in a different one of a plurality of connected non-uniform memory access (NUMA) nodes.

The method further includes, when the unicast transmission mode is selected for transmitting the first communication, transmitting the first communication as a sequential unicast transmission. A sequence of the destination computing nodes for receiving the sequential unicast transmission is selected by greedy nearest neighbor matching.

In the method, the receiving of the first communication occurs at a first computing node of the destination computing nodes and is received as a unicast packet including a header that indicates the multiple destination computing nodes. The method also includes, when the multicast transmission mode is selected for transmitting the first communication, generating a set of multicast packets and transmitting the set of multicast packets from the first computing node. Each packet in the set of multicast packets indicates one of the destination computing nodes.

The method also includes selecting the unicast transmission mode for transmitting the first communication to a first subset of the plurality of destination computing nodes and selecting the multicast transmission mode for transmitting the first communication to a second subset of the destination computing nodes.

In the method, each of the destination computing nodes includes a processing core and the first communication is a cache invalidation message that, for each of the multiple destination computing nodes, indicates data to be invalidated in a local cache of the destination computing node.

A computing device includes a network interface for receiving, from an origin computing node, a first communication addressed to a plurality of destination computing nodes in a processor interconnect fabric. The computing device also includes an input for receiving a first set of one or more communication metrics associated with a transmission path to one or more of the destination computing nodes. The computing device also includes a router circuit coupled with the input and the network interface that, for each destination computing node in the plurality of destination computing nodes, and based on the set of communication metrics, selects between a multicast transmission mode and unicast transmission mode as a transmission mode for transmitting the first communication to the destination computing node.

In the computing device, each of the destination computing nodes includes a processing core, and first communication identifies data for invalidating in the local cache.

The computing device also includes monitoring circuitry coupled with the input. The monitoring circuitry determines the set of one or more communication metrics by measuring packet latency, throughput, and memory activity associated with a region of the processor interconnect fabric. The transmission path to the destination computing node passes through the region.

The computing device also includes monitoring circuitry coupled with the input. For each region of a plurality of regions in the processor interconnect fabric, the monitoring circuitry measures communication metrics for the region. The measured communication metrics for at least one of the regions includes the first set of one or more communication metrics. For each region of the plurality of regions and for each communication of a set of multiple communications, the router circuit selects between a unicast transmission mode and a multicast transmission mode based on the measured communication metrics for an associated region. A path from the network interface to a destination node of the communication passes through the associated region. The set of multiple communications includes the first communication.

A computing system includes an interconnect fabric and multiple computing nodes connected by the interconnect fabric. A first computing node of the multiple computing nodes receives, from an origin computing node in the plurality of computing nodes, a first communication addressed to multiple destination computing nodes of the multiple computing nodes. The first computing node also receives a first set of communication metrics associated with a transmission path to one or more of the destination computing nodes. For each destination computing node in the plurality of destination computing nodes, the first computing node, based on the set of communication metrics, selects between a multicast transmission mode and unicast transmission mode as a transmission mode for transmitting the first communication to the destination computing node.

In the computing system, the interconnect fabric also includes multiple interconnect links for connecting the origin computing node with each of the destination computing nodes. The interconnect links provide a different communication path between the origin computing node and each of the plurality of destination computing nodes.

The computing system also includes multiple integrated circuit dies each containing a separate region of the interconnect fabric. The first computing node selects the unicast transmission mode for transmitting the first communication between two of the plurality of integrated circuit dies. A second computing node selects the multicast transmission mode for transmitting the first communication from the second computing node to multiple destination nodes of the first communication. The second computing node and the multiple destination nodes reside on the same integrated circuit die of the multiple integrated circuit dies.

In the computing system, the multiple computing nodes includes multiple processing nodes and multiple memory partitions coupled to the processing nodes by the interconnect fabric.

In the computing system the multiple computing nodes are contained within a single device package.

The computing system also includes multiple NUMA nodes each containing a different subset of the multiple computing nodes.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
    receiving, from an origin computing node, a first communication addressed to a plurality of destination computing nodes in a processor interconnect fabric;
    measuring a first set of one or more communication metrics associated with a transmission path to one or more of the plurality of destination computing nodes,
    for each destination computing node in the plurality of destination computing nodes,
        based on the set of communication metrics, selecting one of a multicast transmission mode and unicast transmission mode as a transmission mode for transmitting the first communication to the destination computing node, and
        transmitting the first communication to the destination computing node according to the selected transmission mode.

2. The method of claim 1, wherein measuring the one or more communication metrics further comprises measuring packet latency, throughput, and memory activity associated with a region of the processor interconnect fabric, wherein the transmission path to the destination computing node passes through the region.

3. The method of claim 1, wherein the transmission mode is further selected based on a latency demand for the first communication.

4. The method of claim 1, further comprising, for each region of a plurality of regions in the interconnect fabric:
    measuring communication metrics for the region, wherein the measured communication metrics for at least one of the plurality of regions comprises the set of communication metrics;
    based on the measured communication metrics for the region, selecting a transmission mode for the region independently from the transmission modes selected for other regions of the plurality of regions;
    for each communication of a plurality of communications, wherein the plurality of communications comprises the first communication,
        selecting one of a unicast transmission mode and a multicast transmission mode based on a transmission mode selected for an associated region of the plurality of regions, and
        transmitting the communication through the associated region.

5. The method of claim 1, further comprising, for each region of a plurality of regions in the interconnect fabric:
    identifying a set of nodes within the region based on identifying correlated network performance characteristics of links connecting the set of nodes.

6. The method of claim 5, wherein:
    each region of a plurality of regions in the interconnect fabric resides in a different one of a plurality of connected non-uniform memory access (NUMA) nodes.

7. The method of claim 1, further comprising:
    when the unicast transmission mode is selected for transmitting the first communication, transmitting the first communication as a sequential unicast transmission, wherein a sequence of the destination computing nodes for receiving the sequential unicast transmission is selected by greedy nearest neighbor matching.

8. The method of claim 1, wherein:
    the receiving of the first communication occurs at a first computing node of the destination computing nodes;

the first communication is received as a unicast packet including a header that indicates the plurality of destination computing nodes; and the method further comprises, when the multicast transmission mode is selected for transmitting the first communication:

generating a set of multicast packets, wherein each packet in the set of multicast packets indicates one of the plurality of destination computing nodes, and transmitting the set of multicast packets from the first computing node.

9. The method of claim 1, further comprising:

selecting the unicast transmission mode for transmitting the first communication to a first subset of the plurality of destination computing nodes; and selecting the multicast transmission mode for transmitting the first communication to a second subset of the plurality of destination computing nodes.

10. The method of claim 1, wherein:

each of the destination computing nodes includes a processing core; and the first communication is a cache invalidation message that, for each destination computing node of the plurality of destination computing nodes, indicates data to be invalidated in a local cache of the destination computing node.

11. A computing device, comprising:

a network interface configured to receive, from an origin computing node, a first communication addressed to a plurality of destination computing nodes in a processor interconnect fabric;

an input configured to receive a first set of one or more communication metrics associated with a transmission path to one or more of the destination computing nodes, and a router circuit coupled with the input and the network interface, wherein the router circuit is configured to, for each destination computing node in the plurality of destination computing nodes:

based on the set of communication metrics, select one of a multicast transmission mode and unicast transmission mode as a transmission mode for transmitting the first communication to the destination computing node, and transmit the first communication to the destination computing node according to the selected transmission mode.

12. The computing device of claim 11, wherein:

each of the destination computing nodes includes a processing core; and the first communication identifies data for invalidating in the local cache.

13. The computing device of claim 11, further comprising:

monitoring circuitry coupled with the input, wherein the monitoring circuitry is configured to determine the set of one or more communication metrics by measuring packet latency, throughput, and memory activity associated with a region of the processor interconnect fabric, wherein the transmission path to the destination computing node passes through the region.

14. The computing device of claim 11, further comprising:

monitoring circuitry coupled with the input, wherein the monitoring circuitry is configured to, for each region of a plurality of regions in the processor interconnect fabric, measure communication metrics for the region, wherein the measured communication metrics for at least one of the plurality of regions comprises the first set of one or more communication metrics, wherein the router circuit is further configured to, for each region of the plurality of regions:

for each communication of a plurality of communications, wherein the plurality of communications comprises the first communication, selecting one of a unicast transmission mode and a multicast transmission mode based on the measured communication metrics for an associated region, wherein a path from the network interface to a destination node of the communication passes through the associated region.

15. A computing system, comprising:

an interconnect fabric; and a plurality of computing nodes connected by the interconnect fabric, wherein a first computing node of the plurality of computing nodes is configured to:

receive, from an origin computing node in the plurality of computing nodes, a first communication addressed to a plurality of destination computing nodes in the plurality of computing nodes;

receive a first set of one or more communication metrics associated with a transmission path to one or more of the destination computing nodes, and for each destination computing node in the plurality of destination computing nodes:

based on the set of communication metrics, select one of a multicast transmission mode and unicast transmission mode as a transmission mode for transmitting the first communication to the destination computing node, and transmit the first communication to the destination computing node according to the selected transmission mode.

16. The computing system of claim 15, wherein:

the interconnect fabric further comprises a plurality of interconnect links configured to connect the origin computing node with each of the plurality of destination computing nodes, wherein the plurality of interconnect links provides a different communication path between the origin computing node and each of the plurality of destination computing nodes.

17. The computing system of claim 15, further comprising:

a plurality of integrated circuit dies each containing a separate region of the interconnect fabric, wherein:

the first computing node is configured to select the unicast transmission mode for transmitting the first communication between two of the plurality of integrated circuit dies, and a second computing node is configured to select the multicast transmission mode for transmitting the first communication from the second computing node to a plurality of destination nodes of the first communication, wherein the second computing node and the plurality of destination nodes reside on the same integrated circuit die of the plurality of integrated circuit dies.

18. The computing system of claim 15, wherein:

the plurality of computing nodes comprises a plurality of processing nodes and a plurality of memory partitions coupled to the plurality of processing nodes by the interconnect fabric.

19. The computing system of claim 15, wherein the plurality of computing nodes is contained within a single device package.

20. The computing system of claim 15, further comprising:
a plurality of NUMA nodes each containing a different subset of the plurality of computing nodes.

* * * * *